United States Patent
Schock

(10) Patent No.: US 10,735,619 B2
(45) Date of Patent: Aug. 4, 2020

(54) SLIDE SCANNER

(71) Applicant: reflecta GmbH, Eutingen (DE)

(72) Inventor: Hans-Dieter Schock, Nagold (DE)

(73) Assignee: reflecta GmbH, Eutingen (DE)

( * ) Notice: Subject to any disclaimer, the term of this patent is extended or adjusted under 35 U.S.C. 154(b) by 0 days.

(21) Appl. No.: 16/504,032

(22) Filed: Jul. 5, 2019

(65) Prior Publication Data

US 2020/0059571 A1 Feb. 20, 2020

(30) Foreign Application Priority Data

Aug. 15, 2018 (EP) .................................... 18189145

(51) Int. Cl.
*H04N 1/12* (2006.01)
*H04N 1/409* (2006.01)
*H04N 1/00* (2006.01)

(52) U.S. Cl.
CPC ......... *H04N 1/123* (2013.01); *H04N 1/00493* (2013.01); *H04N 1/00557* (2013.01); *H04N 1/4097* (2013.01)

(58) Field of Classification Search
CPC .......... G01N 2035/00039; G01N 2035/00089; G01N 2035/00138; G01N 35/0099; G02B 21/34; G03B 23/125; G06F 3/0482; G06F 3/04817; G06F 3/04842; G06F 3/0485; G06F 19/321; G06F 2211/005; G06F 3/02; G06F 3/0219; G06F 3/04886; H04N 13/351; H04N 2013/403; H04N 2013/405
USPC ................................................ 358/474, 1.15
See application file for complete search history.

(56) References Cited

U.S. PATENT DOCUMENTS

| | | | | |
|---|---|---|---|---|
| 3,632,200 A | * | 1/1972 | Frey | G03B 23/125 353/109 |
| 3,729,254 A | * | 4/1973 | Frey | G03B 23/125 353/109 |
| 3,745,234 A | * | 7/1973 | Szymber | H04N 5/257 348/101 |
| 3,750,554 A | * | 8/1973 | Debus | B41B 15/00 396/553 |
| 3,860,326 A | * | 1/1975 | Frey | G03B 23/125 353/109 |
| 4,102,569 A | * | 7/1978 | Schwartz | G03B 21/64 353/120 |
| 5,912,699 A | * | 6/1999 | Hayenga | G02B 21/26 348/132 |

(Continued)

FOREIGN PATENT DOCUMENTS

DE 196 21 714 A 12/1997
DE 101 59 598 A1 6/2003

(Continued)

OTHER PUBLICATIONS

European Search Report for corresponding Application No. EP 18 189 145.8, dated Feb. 1, 2019.

(Continued)

*Primary Examiner* — Negussie Worku
(74) *Attorney, Agent, or Firm* — Renner, Otto, Boisselle & Sklar, LLP

(57) ABSTRACT

A slide scanner as a stand-alone device that is able to function without a computer and comprises a magazine guide for different slide magazines, such as universal, LKM, CS and/or Paximat magazines.

11 Claims, 1 Drawing Sheet

(56) References Cited

U.S. PATENT DOCUMENTS

| | | | | |
|---|---|---|---|---|
| 6,905,300 B1* | 6/2005 | Russum | ........... | G01N 35/00029 406/86 |
| 2005/0248738 A1* | 11/2005 | Minami | ................. | G03B 27/46 355/29 |
| 2007/0103772 A1* | 5/2007 | Virag | ................. | G01N 35/0099 359/386 |
| 2008/0057099 A1* | 3/2008 | Hermansson | ......... | A61L 27/306 424/423 |
| 2009/0167854 A1 | 7/2009 | Hsu | | |
| 2009/0257772 A1* | 10/2009 | Hoshino | ............ | G03G 15/6538 399/81 |
| 2009/0316171 A1* | 12/2009 | Kurihara | ............ | H04N 1/00204 358/1.9 |
| 2011/0243586 A1* | 10/2011 | Fukushi | ............. | G03G 15/0291 399/38 |
| 2014/0301744 A1* | 10/2014 | Tenjiku | .............. | G03G 21/1842 399/13 |
| 2015/0353309 A1* | 12/2015 | Majima | .................... | B65H 7/20 358/1.13 |
| 2018/0007233 A1* | 1/2018 | Aramaki | ............ | G06K 9/00456 |
| 2018/0346213 A1* | 12/2018 | High | .................. | B65D 63/1009 |
| 2019/0352114 A1* | 11/2019 | Crisolo | .................... | B65H 7/02 |

FOREIGN PATENT DOCUMENTS

| | | |
|---|---|---|
| EP | 2 129 098 A1 | 12/2009 |
| GB | 2 150 782 A | 7/1985 |

OTHER PUBLICATIONS

Unknown: "Bedienungsanleitung reflecta DigitDia 6000 CyberView X5", Apr. 11, 2018, XP055547764, URL:https://reflecta.de/uploads/files/20180411095322_Bedienungsanleitung-DD-6000-deutsch.pdf, obtained Jul. 5, 2019.

* cited by examiner

SLIDE SCANNER

CROSS REFERENCE TO RELATED APPLICATIONS

This application claims priority under 35 USC § 119 to European Patent Application No. 18 189 145.8, filed Aug. 15, 2018, the entire disclosure of which is incorporated herein by reference.

TECHNICAL FIELD

The invention relates to a slide scanner. A slide scanner is used to convert slides, which is to say transparent, photographic, framed pictures, into digital image files in which image contents of the slides are digitally stored. The conversion of slides into digital image files is also referred to as the digitization of slides.

SUMMARY

It is the object of the invention to propose a slide scanner for automatically scanning slides from a slide magazine. Here, a slide magazine refers in particular to that used for projecting slides using conventional slide projectors.

The slide scanner according to the invention includes a magazine guide for displaceably guiding the slide magazine, preferably in the longitudinal direction thereof, and a magazine advancing mechanism for preferably incrementally advancing the slide magazine in the magazine guide by a distance between the slides in the slide magazine, with respect to one another, in the longitudinal direction or the advancing direction.

Moreover, the slide scanner according to the invention comprises a scanning device for scanning a slide, and a feeding device for feeding a slide from the slide magazine in the magazine guide into the scanning device and, after the slide has been scanned, back into the slide magazine. It is also possible to design the slide scanner with two magazine guides for two slide magazines, and to remove a slide from one of the two slide magazines using the feeding device, feed the slide to the scanning device and, after scanning, move it into the other slide magazine. The scanning device normally transilluminates a slide and projects this onto an image sensor, which is to say onto a light-sensitive surface of an integrated circuit.

The slide scanner according to the invention is designed as what is known as a stand-alone device, which is capable of functioning without further devices. As a result, the slide scanner according to the invention does not have to be connected to a computer or the like for digitization. To this end, the slide scanner according to the invention comprises a digital data memory for storing the digital image files, and a processor for controlling the components of the slide scanner and for digitally processing data of the scanning device. The components of the slide scanner are, in particular, the magazine guide and the magazine advancing mechanism, the scanning device, and the feeding device. Moreover, the processor calculates the digital image data from analog signals and/or digital values of the scanning device, provided this is not already carried out by the scanning device. The processor may be part of the scanning device; for example, the image sensor can also include the processor or parts of the processor.

In a preferred embodiment of the invention, the magazine guide and the magazine advancing mechanism are designed for different slide magazine types, which is to say it is possible to use, for example, so-called universal magazines according to DIN 108, Leica Kindermann magazines (LKM), CS (Compact Secure) magazines and/or Paximat magazines, without modifying the slide scanner.

One embodiment of the invention provides a plug-in connection, such as a USB, mini USB or micro USB port and/or a FireWire port for data transmission, which is to say, in particular, for transmission of the image files, to or from an external data processing device and/or to an external storage medium. By way of the plug-in connection, the image files of the slide scanner according to the invention can be transmitted onto a storage medium, such as a USB stick or an external hard drive, without an additional device, and in particular without a computer. The plug-in connection potentially also allows data communication with a computer.

In a preferred embodiment of the invention, the slide scanner includes software for dust and scratch correction. Such methods are known and will not be described in greater detail here.

With a view to usability as a stand-alone device, one embodiment of the invention provides a screen for viewing the scanned slides, which is to say the content of the image files. The screen can be provided in a fixed manner. In particular, this is designed as a folding screen, which is disposed on the slide scanner so as to be pivoted back and forth between a viewing position, in which a representation on the folding screen is visible, and a non-usage position. In the non-usage position, the folding screen rests against a housing of the slide scanner, or the housing includes a recess for the folding screen, into which the folding screen can be pivoted when not in use. In the non-usage position, the folding screen consequently does not undesirably protrude from the housing at the slide scanner and is protected against damage. In particular, a viewing side on which the slides are displayed faces the housing of the slide scanner in the non-usage position.

For faster scanning of the slides, one embodiment of the invention provides an area sensor as the image sensor, which detects the image as a whole and at once, in contrast to a line sensor, which detects an image, line by line and point by point.

The features disclosed, in the foregoing general description, the following description of one exemplary embodiment, the claims and the drawing, can each be present alone, or as several, or all, thereof together in any arbitrary combination, in embodiments of the invention. The above-described embodiments and configurations of the invention can be arbitrarily combined.

BRIEF DESCRIPTION OF THE DRAWING

The invention will be described hereafter in greater detail based on one exemplary embodiment shown in the drawings.

DETAILED DESCRIPTION

Figure 1:
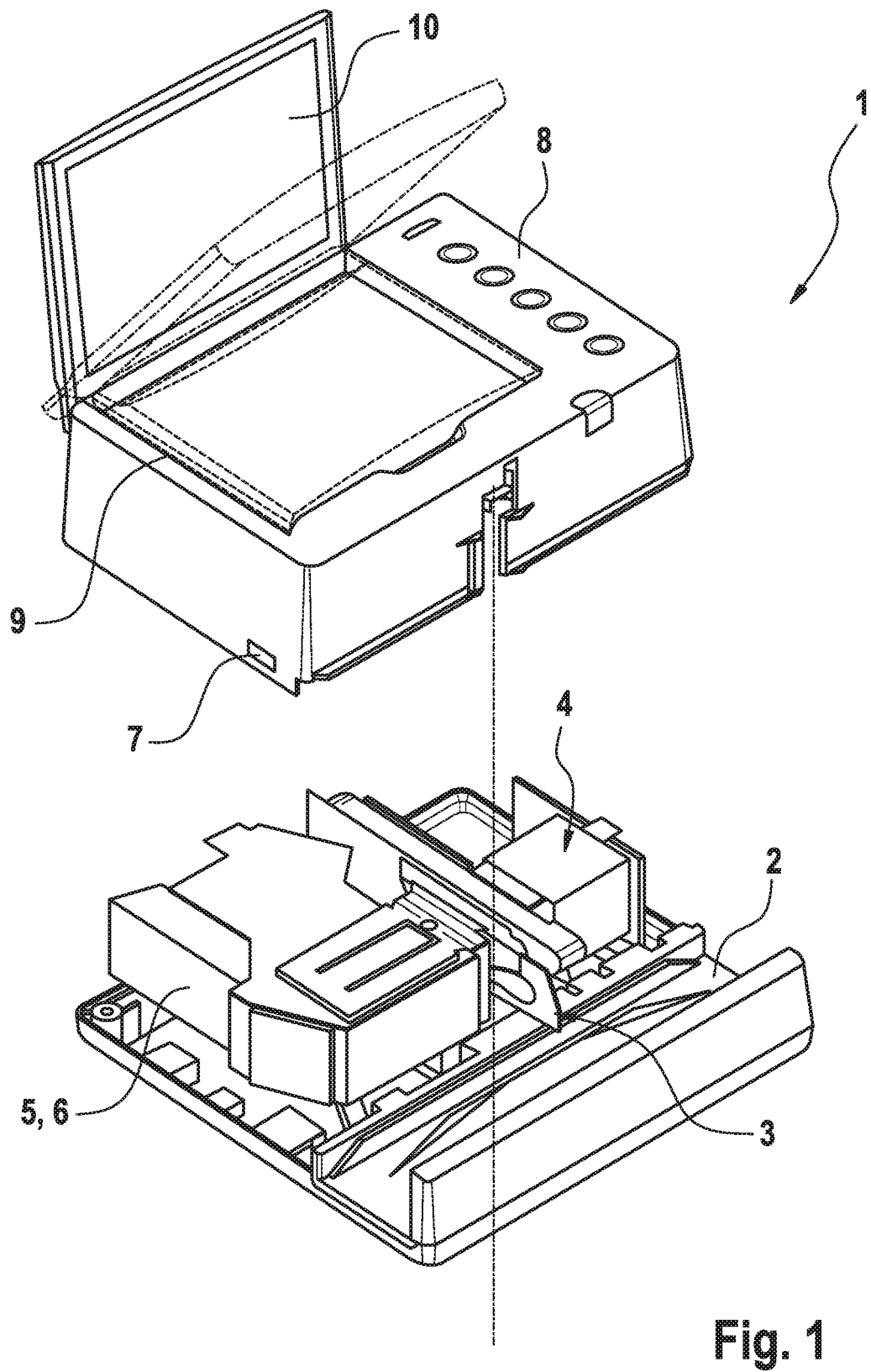
FIG. 1 shows a perspective illustration of a slide scanner according to the invention with the housing lifted off.

Referring to FIG. 1, a slide scanner 1 according to the invention is used to digitize slides, which is to say convert slides into digital image files.

This includes a magazine guide 2 comprising a magazine advancing mechanism, by way of which a slide magazine, which is not shown and inserted into the magazine guide 2, can be incrementally displaced in the longitudinal direction thereof by the respective distance between two slides in the magazine guide 2, so that a slide can be transported from the slide magazine into an access position of a feeding device 3 of the slide scanner 1. The magazine guide 2 and the magazine advancing mechanism are designed for a use of different slide magazines, such as are used for slide projectors. For example, it is possible to use universal magazines according to DIN 108, Leica Kindermann magazines (LKM), CS (Compact Secure) magazines and/or Paximat magazines, without modifying the slide scanner 1 or the magazine guide 2 and the magazine advancing mechanism.

The feeding device 3 removes a slide, which is located in the access position of the magazine guide 2, from the slide magazine, which is not shown, and transports this into a scan position between a light source 4, the housing of which is visible in the drawing, and a scanning device 5.

The light source 4 transilluminates the slide and projects the image of the slide onto a light-sensitive surface of an image sensor 6 of the scanning device 5. Reference numeral 6 in the drawing denotes a circuit board, having the image sensor 6 disposed thereon on a side facing away from an observer. For rapid scanning, the slide scanner 1 in the exemplary embodiment comprises an area sensor serving as the image sensor 6, which converts all points of the projected image into digital values, simultaneously.

The slide scanner 1 is a stand-alone device, which is able to function without a further device and does not need to be connected to a computer, for example. At the same time, a connection to a computer or another data processing device is possible. For the configuration as a stand-alone device, the slide scanner 1 according to the invention comprises a processor for digitally processing the digital values of the image sensor 6 into a digital image file, and a digital data memory for storing the image file. In the exemplary embodiment, the processor and the data memory are combined in a microprocessor, which is disposed on the circuit board of the scanning device 5, on which the image sensor 6 is also disposed. Similarly to the image sensor 6, the microprocessor is located on the side of the circuit board facing away from the observer and is therefore not visible.

The processor or microprocessor also controls the components of the slide scanner 1, and in particular the magazine advancing mechanism, the feeding device 3, the light source 4 and the image sensor 6 of the scanning device 5. The microprocessor also includes software for digital dust and scratch removal or dust and scratch correction, for which purpose the light source 4 additionally comprises an infrared light source, which, however, is not mandatory for the invention.

After scanning, the feeding device 3 transports the slide back into the slide magazine in the magazine guide 2, which is subsequently advanced by one slide by the magazine advancing mechanism, so that the next slide reaches the access position of the feeding device 3.

For the transmission of the image files onto an external data memory, such as a USB stick or an external hard drive, the slide scanner 1 comprises a plug-in connection 7, for example a USB port and/or a FireWire port. It is also possible to communicate with an external data processing device, and in particular with a computer, via the plug-in connection 7. In this way, the slide scanner 1 designed as a stand-alone device can be controlled by way of a computer.

A housing 8 of the slide scanner 1 includes a rectangular recess 9 for a folding screen 10, into which the folding screen 10 can be lowered when not in use, so that the rear side of the folding screen 10 is flush with a surface of the housing 8. The actual screen of the folding screen 10 faces a base of the recess 9 in the housing 8 of the slide scanner 1 in this non-usage position, which is represented by dotted lines, and is thus protected. To view the image files, the folding screen 10 can be pivoted, as shown, upwardly out of the recess 9 of the housing 8, so as to project obliquely upwardly from the housing 8 and so that the actual screen is visible.

The invention claimed is:

1. A slide scanner for converting slides into digital image files, comprising:
    a housing including a magazine guide and a magazine advancing mechanism for a slide magazine,
    a scanning device for scanning a slide to convert the slide into a digital image file, wherein the slide is a transparent, photographic image,
    a feeding device for feeding the slide from the slide magazine into the scanning device and back into the slide magazine or into another slide magazine,
    a digital data memory for storing the digital image file, and
    a processor for controlling the components of the slide scanner and for digitally processing data of the scanning device;
    wherein the scanning device, the feeding device, the digital data memory and the processor are within the housing such that the slide scanner is a stand-alone device, which is able to function without further devices.

2. The slide scanner according to claim 1, wherein the magazine guide and the magazine advancing mechanism are suitable for different slide magazine types.

3. The slide scanner according to claim 1, wherein the slide scanner comprises a plug-in connection for data transmission with an external data processing device and/or with a storage medium.

4. The slide scanner according to claim 1, wherein the slide scanner includes software for dust removal and/or scratch removal.

5. The slide scanner according to claim 1, wherein the slide scanner comprises a screen, and in particular a folding screen, which can be pivoted back and forth between a viewing position, in which a representation on the folding screen is visible, and a non-usage position, in which the folding screen rests against a housing of the slide scanner or in a recess of the housing, for displaying scanned slides.

6. The slide scanner according to claim 1, wherein the scanning device comprises an area sensor, serving as an image sensor.

7. A slide scanner for converting slides into digital image files, comprising:
    a magazine guide and a magazine advancing mechanism for a slide magazine,
    a scanning device for scanning a slide,
    a feeding device for feeding a slide from the slide magazine into the scanning device and back into the slide magazine or into another slide magazine, and
    a screen, and in particular a folding screen, which can be pivoted back and forth between a viewing position, in which a representation on the folding screen is visible, and a non-usage position, in which the folding screen rests against a housing of the slide scanner or in a recess of the housing, for displaying scanned slides,
    wherein the slide scanner is a stand-alone device, which is able to function without further devices and includes a digital data memory for storing the digital image files and a processor for controlling the components of the slide scanner and for digitally processing data of the scanning device.

8. The slide scanner according to claim 7, wherein the magazine guide and the magazine advancing mechanism are suitable for different slide magazine types.

9. The slide scanner according to claim 7, wherein the slide scanner comprises a plug-in connection for data transmission with an external data processing device and/or with a storage medium.

10. The slide scanner according to claim 7, wherein the slide scanner includes software for dust removal and/or scratch removal.

11. The slide scanner according to claim 7, wherein the scanning device comprises an area sensor, serving as an image sensor.

\* \* \* \* \*